3,462,681
FAULT LOCATING SYSTEM UTILIZING NARROW
BANDWIDTH CHANNEL TO TRANSMIT FAULT
SURGE ARRIVAL TIMES TO A MASTER TIMING
LOCATION
Donald R. Biskup, Kansas City, Mo., assignor to American Telephone and Telegraph Company, New York, N.Y., a corporation of New York
Filed Aug. 23, 1967, Ser. No. 662,806
Int. Cl. G01r 31/08, 31/11; H04m 3/26
U.S. Cl. 324—52          7 Claims

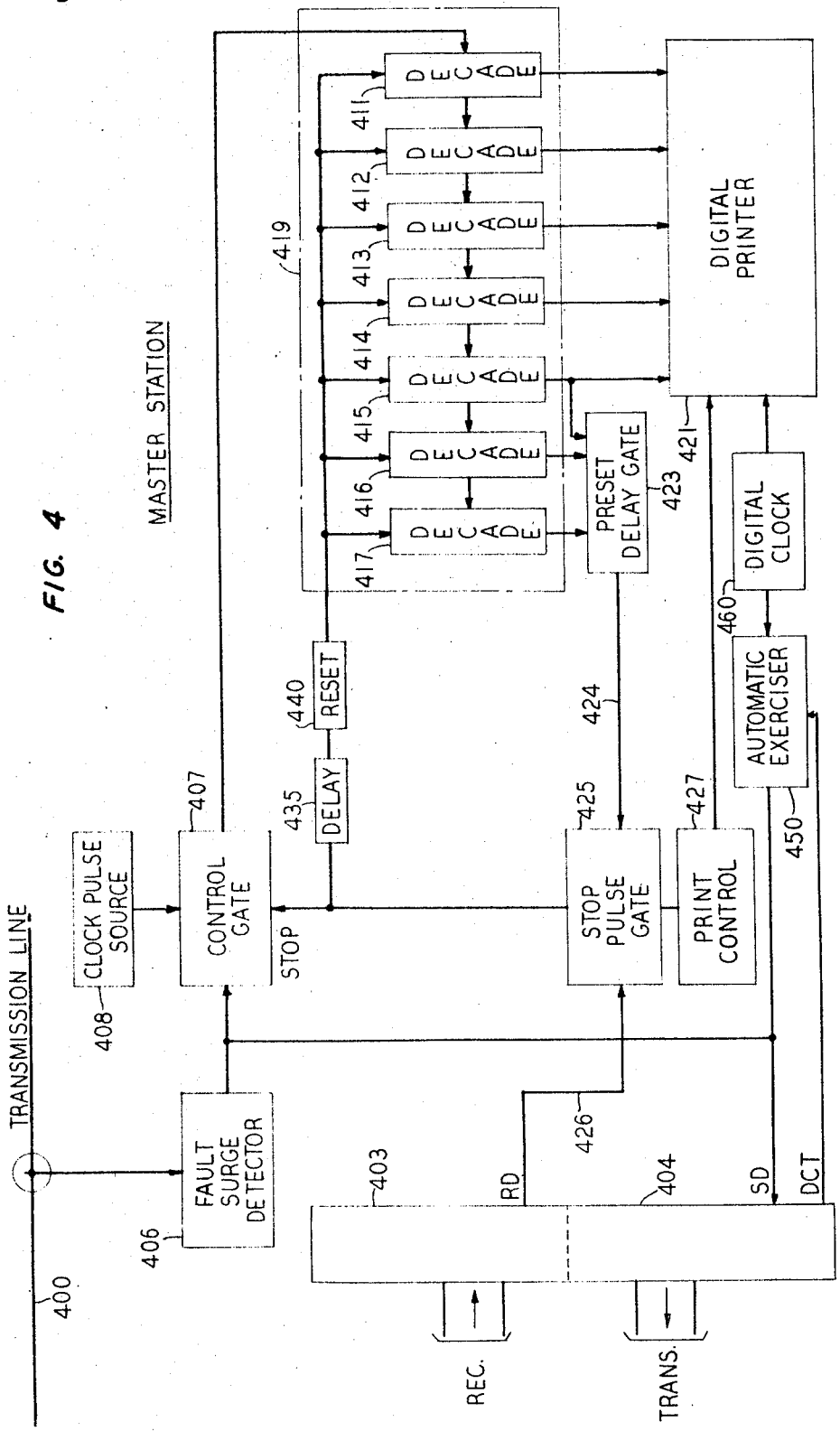

ABSTRACT OF THE DISCLOSURE

A digital fault locating system times the interval between the respective arrivals of oppositely directed fault surges at the opposite end terminals of a high voltage power transmission line to locate a fault therein. The fault surge arriving at the one end terminal is utilized to initiate timing action in a digital time interval measuring set. The oppositely directed fault surge arriving at the other end terminal is utilized to activate a stop time measurement pulse generator and synchronizing apparatus which synchronizes a four phase synchronous data transmission system with the leading edge of the detected faulted surge. The data transmission system transmits the generated stop time measurement pulse to the one terminal where it halts the timing measurement of the time interval measuring set. The measured time interval is converted to a distance measurement to locate the fault.

Field of the invention

This invention relates to fault locating systems and, more particularly, to a time interval measuring type of fault locating system responsive to detected fault surges at the opposite end terminals of a high voltage power transmission facility.

Background of the invention

Permanent and momentary faults in electric power transmission lines frequently are the cause of interruptions in the transmission of electrical power. Permanent faults cause an immediate interruption of power transmission. Momentary faults while causing no readily apparent immediate damage may cause slight damage which with the passage of time may progressively develop into a permanent fault that consequently interrupts the transmission of power. In order to prevent such interruptions or to insure a prompt resumption of transmission, it is iomperative that these faults be located as quickly and as accurately as possible. There are many techniques which are used to locate faults, such as bridge balancing and other similar calibration methods. Many of these fault locating methods do not detect or locate momentry faults, however. The location of momentary faults, therefore, generally requires a subsequent tedious visual inspection of the entire power transmission line. Many of the aforementioned fault locating methods currently used are also cumbersome and additionally require highly skilled perconnel to operate them.

Fault locating systems which locate faults by measuring the propagation time of fault surges along the transmission line detect and locate both permanent and momentary faults. These types of fault locating systems in addition to being very accurate are automatic in operation and hence do not require highly skilled personnel to operate them. One such fault locating system is disclosed by T. W. Strinfigel det al. in Patent 2,752,526, issued Nov. 29, 1955. This fault locating system includes monitoring equipment to detect fault surges at the opposite end terminals of a power transmission line. The fault surge detected at the one end terminal starts a free running counter. The fault surge detected at the other end terminal activates circuitry which after a fixed delay generates a stop counter signal. The stop counter signal is transmitted, via a radio transmission system, to the one end terminal. The free running counter in response to the received stop counter signal halts counting. The readout of the halted counter is converted into a distance measurement to locate the fault.

While the aforementioned system is accurate and simple to operate, a very broad band facility is needed to transmit an accurate stop counter signal from the other end terminal of the power transmission line to the counter at the one end terminal. This facility generally comprises either a microwave transmission system or a radio transmission system. A microwave transmission system is very expensive and requires a line of sight transmission system. The radio transmission system is subject to the influence of atmospheric conditions which cause fading and distortion of the stop counter signal. Therefore, a radio transmitted stop counter signal may not have the necessary precision to accurately locate a fault.

It is therefore an object of the invention to locate faults in a power transmission line with a fault surge responsive fault location system having a single timing mechanism at the one end terminal without the necessity of providing a broadband transmission facility to transmit timing information from the other end terminal to the one end terminal.

It is another object of the invention to transmit accurate timing information from the other end terminal to the one end terminal via an audio frequency band communication channel.

Summary of the invention

A fault locating system in accordance with the present invention, has a time interval measuring set at the one end terminal of a power transmission line. A narrow bandwidth channel comprising a synchronous data transmission system utilizing audio frequency band telephone lines or other narrow bandwidth communication channels couples the time interval measuring set to equipment at the other end terminal of the power transmission line. The time interval measuring set measures the time difference between the arrival of fault surges at each end terminal of the power transmission line.

In accordance with the invention, fault surge detectors are connected to each end terminal of the power transmission line. At the one end terminal, the fault surge detector in response to a fault surge activates the time interval measuring set. At the other end terminal, the fault surge detector in response to the oppositely directed fault surge activates a data set synchronizer which causes a stop time measurement pulse generator to generate a stop time measurement pulse at the expiration of a preselected fixed timing duration. The data set synchronizer generates synchronizing timing signals in synchronism with the leading edge of the detected fault surge. The synchronizing timing signals are utilized as the controlling timing signal source for the synchronous data transmission system coupling the stop time measurement pulse generator to the time interval measuring set. At the termination of the aforesaid fixed timing duration, the stop time measurement pulse is applied to the synchronous data transmission system in exact synchronism with the synchronizing timing signals. The stop time measurement pulse transmitted to the one end terminal is utilized to halt the timing action of the time interval measuring set. The measured time interval is converted into a direct distance indication to determine the location of the fault.

It is apparent from the foregoing that, by synchronizing the synchronous data transmission system with the generated stop time measurement pulse, the stop time measurement pulse is inserted into the synchronous data transmission system without error producing variable delay.

A synchronous data transmission system applicable to telephone lines or narrow bandwith communication channels and suitable for use with the present invention is disclosed in P. A. Baker, Patent 3,128,343, issued Apr. 7, 1964. The Baker patent discloses a four-phase modulation type synchronous data transmission system wherein pairs of binary digits, designated dibits, are encoded for transmission purposes as predetermined phase shifts of a carrier signal. The transmitted phase shifts of the carrier signal are recovered at the receiving terminal of the synchronous data transmission system and are utilized to reproduce the transmitted binary data in addition to providing the reference timing signals to operate the receiver.

Binary data applied to the aforementioned synchronous data transmission system is not transmitted immediately upon its application. Each dibit of binary data is stored and delayed until a dibit transmission slot occurs. Applicant's invention specifically controls the timing of the synchronous transmission system so that the transmission slot always occurs in a precise phase relation with the binary data to be transmitted. Hence the stop time measurement pulse is inserted synchronously and with a precisely controlled delay period into the synchronous data transmission system. The particular synchronous data transmission disclosed in the Baker patent will be utilized in the illustrative embodiment of the present disclosure to illustrate the applicant's invention. Hence a detailed description of the synchronous data transmission system is believed to be unnecessary. However, it is to be understood that other synchronous data transmission systems may be readily utilized to implement the principles of applicant's invention.

Drawings

These and other objects and features of the invention will appear more clearly upon consideration of the following detailed description of an illustrative embodiment of the invention taken in conjunction with the drawings wherein.

Figure 3:
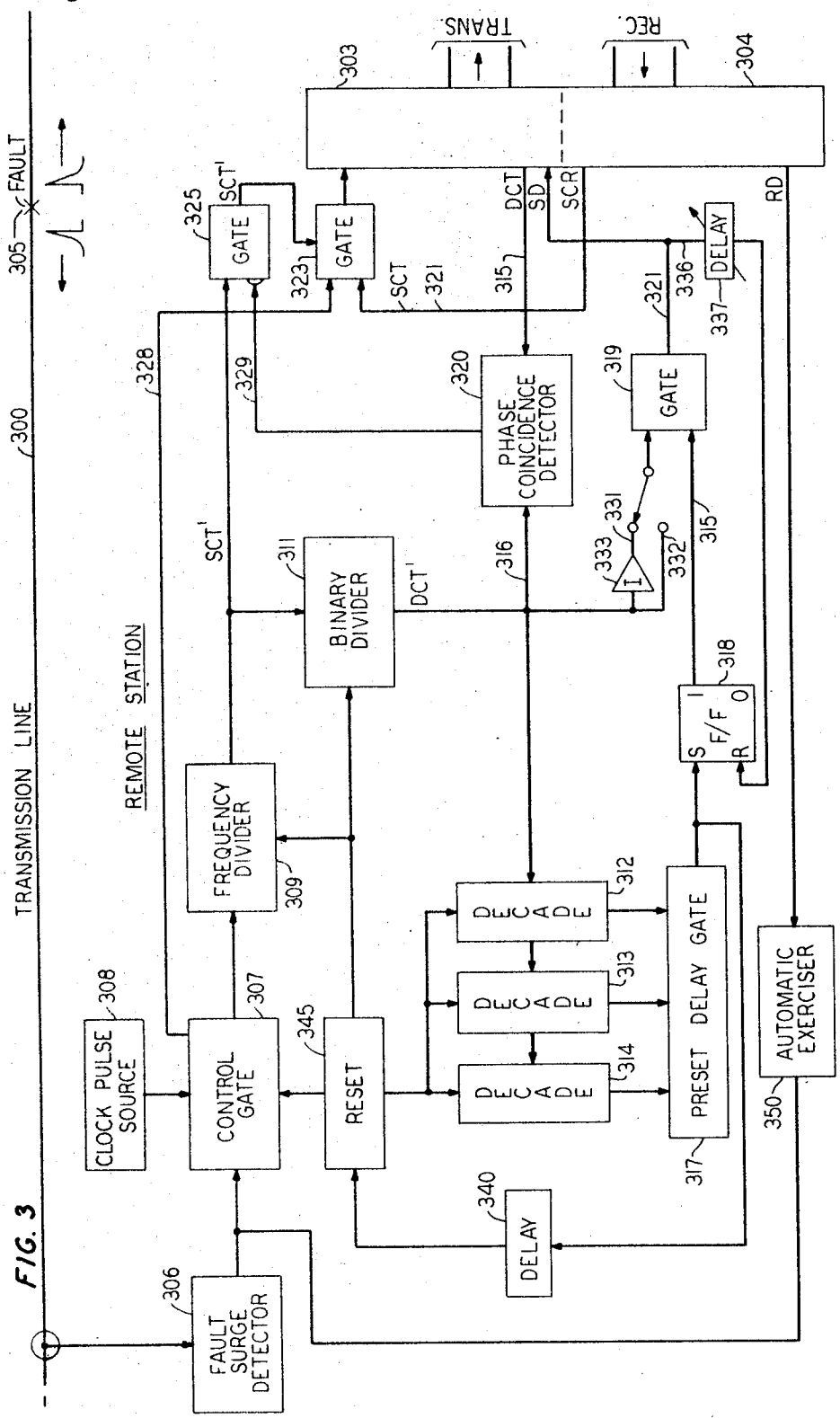

FIGS. 3 and 4 combined is a detailed block diagram of one illustrative embodiment of a fault locating system according to the present invention as applied to locating faults in a power transmission line;

FIG. 5 shows the relative position of combined FIGS. 3 and 4; and

Figure 6:
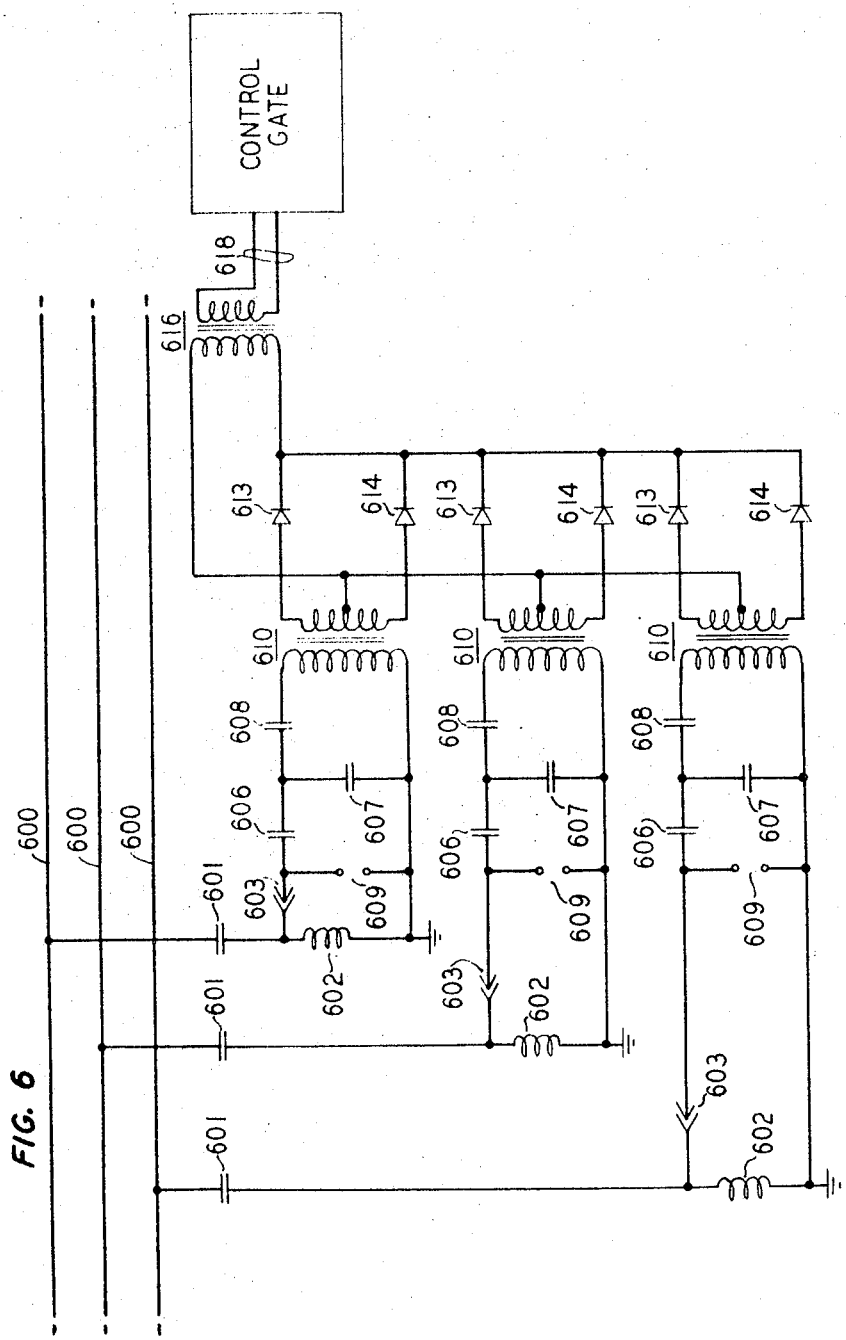

FIG. 6 is a detailed schematic circuit diagram of one illustrative embodiment of a fault surge detector according to the present invention which may be used in the fault locating system disclosed in FIGS. 3 and 4.

Detailed description

Figure 1:
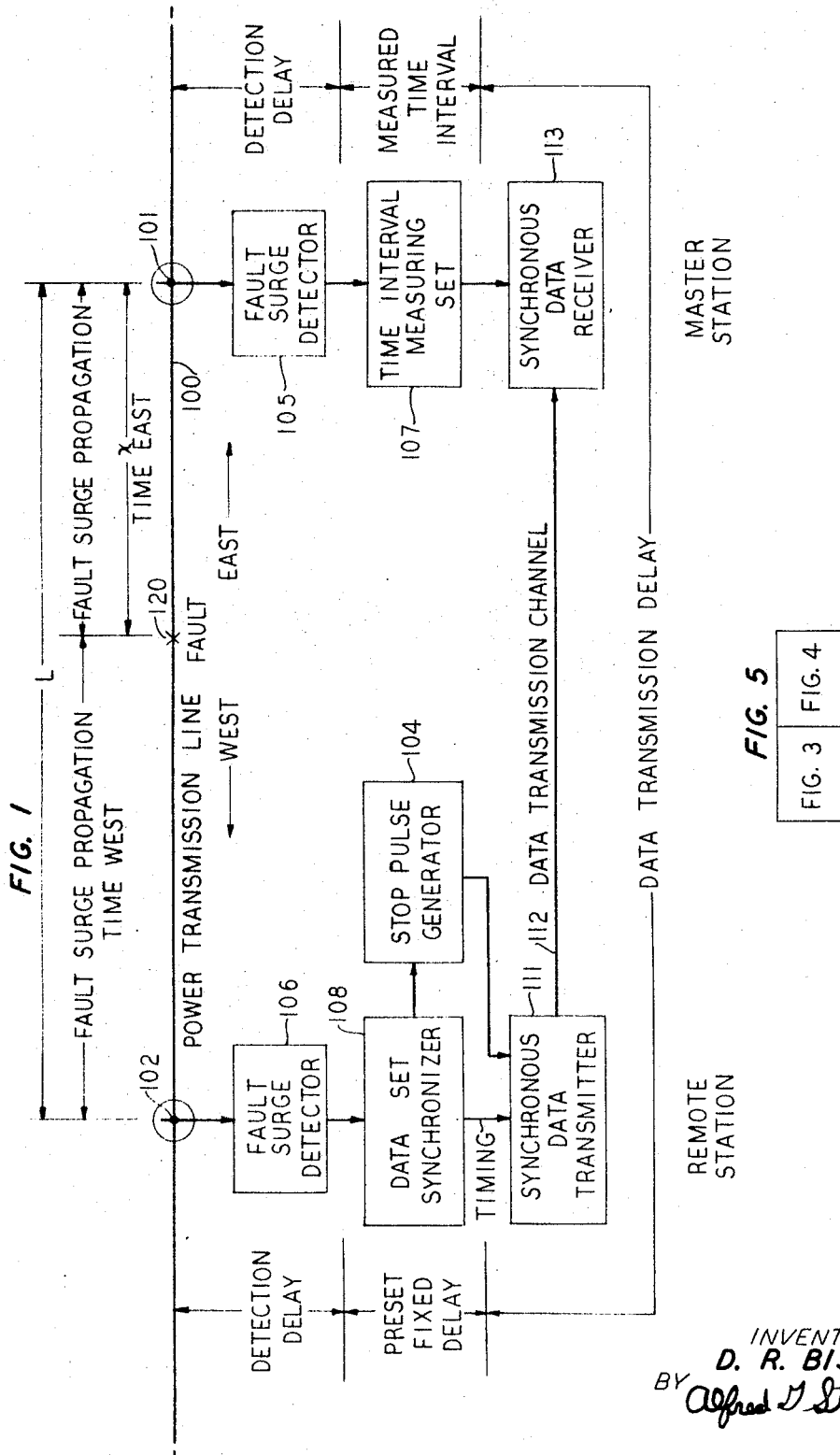
FIG. 1 is a block diagram illustrative of the broad principles by which the present invention locates faults by timing the arrivals of the fault surges at the end terminals of the power transmission line.

FIG. 1 shows a power transmission line 100 interconnecting a master station to a remote station. The power transmission line 100 may comprise a three-wire, three phase power line or a single wire, single phase power line or any other suitable high voltage power transmission facility consisting of a continuous power transmission medium. Two fault surge detectors 105 and 106 are connected to the power transmission line 100 at the master and remote locations, respectively. The fault surge detectors 105 and 106 each translate the steep wave front of a detected fault surge into a pulse signal with a fixed polarity and a very rapid rise time. The fault surge responsive output signal of the fault surge detector 105 is applied to a time interval measuring set 107. The time interval measuring set 107, in response thereto, begins measuring a time interval.

The data transmission set synchronizer 108, in response to the output signal of the fault surge detector 106, generates in phase therewith a series of timing pulse signals. This series of timing pulse signals is applied to the synchronous data transmission system comprising a synchronous data transmitter 111, a data transmission channel 112 and a synchronous data receiver 113.

While many synchronous data transmission systems are suitable for use with the present invention, the invention will be described with particular reference to the synchronous data transmission system disclosed in the aforementioned Baker patent. This particular synchronous data transmission system, accepts input data for transmission only at a positive transition of the timing pulse signals controlling the transmission system. Hence if a data signal to be transmitted is in exact phase with a positive transition of the timing pulse signals, the synchronous data transmission system accepts it for transmission without delay. If the data signal is out of phase with a positive transition, it is not accepted for transmission until a positive transition of the timing pulse signal occurs.

At the expiration of a fixed time interval, preset by the data transmission set synchronizer 108, the stop pulse generator 104, in response thereto, generates a stop time measurement pulse in exact synchronism with a positive transition of the generated timing pulse signals.

The stop time measurement pulse is received at the synchronous data receiver 113 from whence it is applied to the time interval measuring set 107. The time interval measuring set 107 upon receipt of the stop time measurement pulse halts the measured time interval.

Inasmuch as the positive transition of the timing pulses and the stop time measurement pulse are in an exact predetermined phase relationship with the detected fault surge, no delay variations are encountered in the insertions of the stop time measurement pulse into the synchronous data transmission system. Hence the only time variable in the total measured time interval is the variable time interval representing the time difference between the arrivals of the fault surges at the points 101 and 102 at the master and remote stations, respectively.

The total measured time interval comprises a plurality of fixed and variable time intervals as shown by the designated time durations in FIG. 1. This plurality of time intervals, as measured by the time interval measuring set 107, is respectively due to signal delays caused by the fault surge detectors 106 and 105, the data transmission synchronizer 108, the synchronous data transmitter 111, the data transmission channel 112 and the synchronous data receiver 113. Each of these time intervals is a fixed predeterminable constant. Upon the determination of these constants, the variable time interval representing the difference of the respective arrival times of the fault surges at points 101 and 102 may readily be derived from the time interval measured by the time interval measuring set 107. The location of the fault may then be determined as a function of the aforementioned variable time interval.

The actual fault location calculations may be best explained by means of an illustrative example. For the purpose of illustration it will be assumed that a fault has occurred in the transmission line 100 at point 120. Upon the occurrence of the fault, fault surges are propagated in both an easterly and westerly direction toward the master and remote stations, respectively. The easterly directed fault surge is detected upon its arrival at point 101 by the fault surges detector 105 which in turn applies a pulse signal to the time interval measuring set 107. The time interval measuring set 107 in response to this pulse signal begins measuring a time interval at an elapsed time $T_1$ which is subsequent to the fault; wherein $$T_1 = T_{PE} + T_{105} \qquad (1)$$

where $T_{PE}$ = propagation time of the easterly directed fault surge $T_{105}$ = signal delay time of the fault surge detector 105

The westerly directed fault surge is detected upon its arrival at point 102 by the fault surge detector 106 which in turn applies a pulse signal to the data set synchronizer 108. The data set synchronizer 108 after a predetermined fixed time interval, activates the stop pulse generator 104 to generate a stop time measurement pulse which is applied to the synchronous data transmitter 111. The synchronous data transmitter 111 encodes the stop time measurement pulse and applies it to the data transmission channel 112 which transmits it to the synchronous data receiver 113. The synchronous data receiver 113 decodes the transmitted signal and applies a stop time measurement pulse to the time interval measuring set 107 to terminate the measured time interval. The total elapsed time $T_2$ subsequent to the fault at which the time interval measuring set 107 is halted is $$T_2 = T_{PW} + T_{106} + T_{108} + [T_{111} + T_{112} + T_{113}] \quad (2)$$

where $T_{PW}$ = propagation time of the westerly directed fault surge $T_{106}$ = signal delay time of the fault surge detector 106

$T_{108}$ = preset fixed delay time of data set synchronizer 108

$T_{111}, T_{112}, T_{113}$ = delays of the components of the synchronous data transmission system in transmitting a stop time measurement pulse from the remote to the master station Hence the total measured time interval $T_e$ is $$T_e = T_2 - T_1 = T_{PW} - T_{PE} + [T_{106} - T_{105}] + T_{108} + [T_{111} + T_{112} + T_{113}] \quad (3)$$

or $$T_e = T_{PW} - T_{PE} + \text{a constant} \quad (4)$$

The average propagation time $T_L$ of a fault surge along the entire length of the line from point 101 to point 102 and vice versa may be experimentally determined by applying a simulated fault surge to point 101 and subsequently to point 102.

With a simulated fault surge applied to point 101

$$T'_1 = T_{105} \quad (5)$$
$$T'_2 = T_L + T_{106} + T_{108} + [T_{111} + T_{112} + T_{113}] \quad (6)$$

Hence the measured time interval $T_f$ is $$T_f = T'_2 - T'_1 = T_L + [T_{106} - T_{105}] + T_{108} + [T_{111} + T_{112} + T_{113}] \quad (7)$$

or $$T_f = T_L + \text{a constant} \quad (8)$$

With a simulated fault surge applied to point 102

$$T''_1 = T_L + T_{105} \quad (9)$$
$$T''_2 = T_{106} + T_{108} + [T_{111} + T_{112} + T_{113}] \quad (10)$$

Hence the measured time interval $T_g$ is $$T_g = T''_2 - T''_1 = -T_L + [T_{106} - T_{105}] + T_{108} + [T_{111} + T_{112} + T_{113}] \quad (11)$$

or $$T_g = \text{a constant} - T_L \quad (12)$$

Hence $$T_L = \frac{1}{2}(T_f - T_g) \quad (13)$$

and $$\text{a constant} = \frac{1}{2}(T_f + T_g) \quad (14)$$

It is therefore apparent to those skilled in the art that the location of the fault may be determined by the expression $$\frac{T_e - T_L}{T_f} = \frac{X}{L} \quad (15)$$

where $X$ = the distance of the fault from point 101; and
$L$ = the total length of the transmission line from point 101 to 102.

The conventional power transmission system is protected at various substations from system overloads by circuit breakers. These circuit breakers open in response to the aforementioned fault surge. When they reclose following the fault surge, the reclosure action generates transient voltages which may be utilized as an automatic simulated fault surge which the fault locating system times to determine the aforementioned propagation time for the entire length of the power transmission line.

Figure 2:
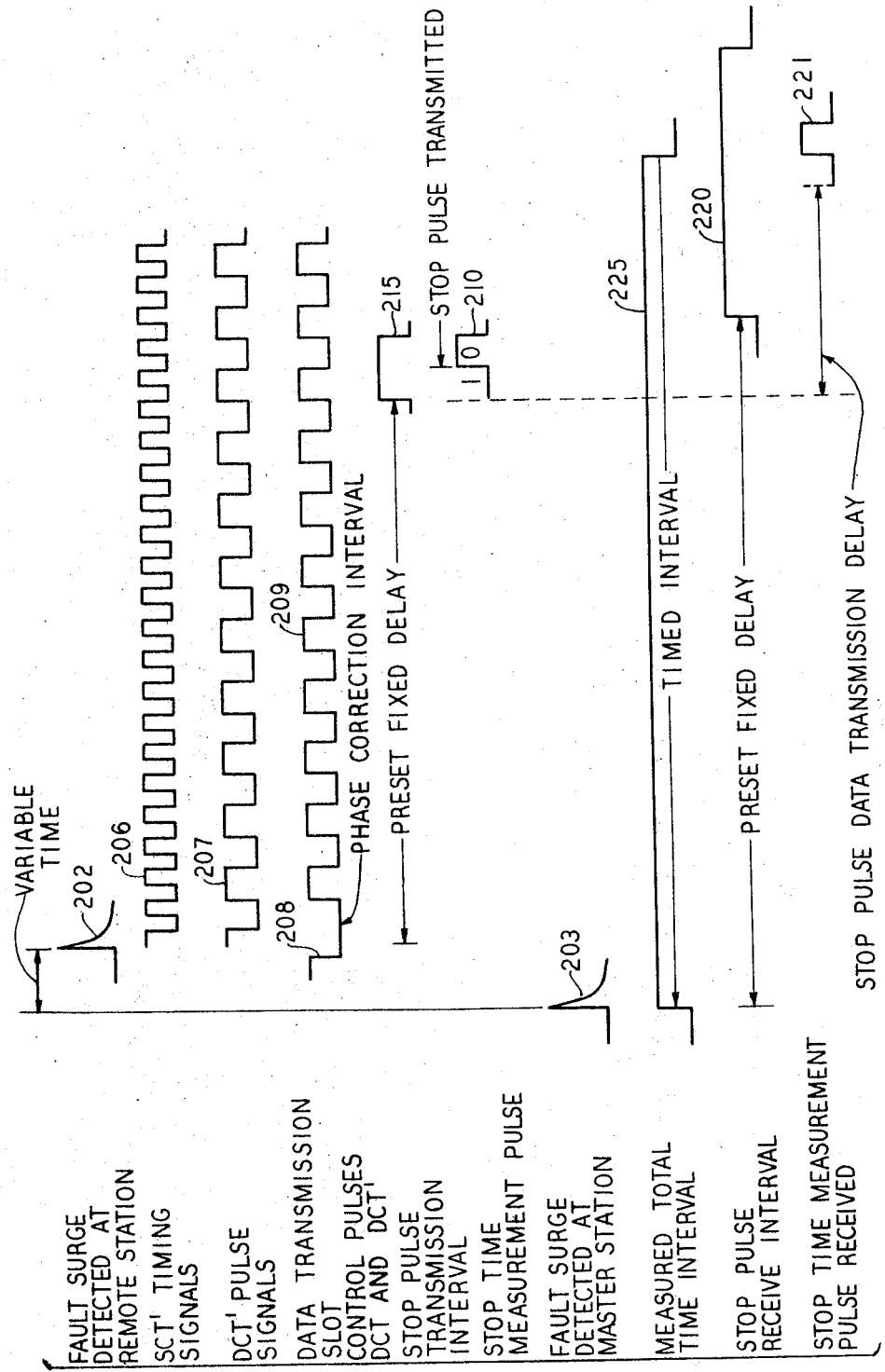
FIG. 2 illustrates the relation of the various fault responsive timing and gating signals generated by the fault locating system disclosed in FIGS. 3 and 4.

FIGS. 3 and 4, positioned as shown in FIG. 5, show an illustrative embodiment of the invention implementing the principles disclosed in FIG. 1. FIG. 2 shows the time relations of certain fault responsive timing and gating signals of the fault locating system and will be explained in conjunction with the explanation of the operation of the illustrative embodiment of the invention shown in FIGS. 3 and 4. The most significant digit of the reference numerals used to identify the component parts of the invention also identify the particular figure in which the component part is located. For example, the reference numeral 307 refers to a control gate which is located in FIG. 3.

A power transmission line respectively designated 300 and 400 in FIGS. 3 and 4 is shown interconnecting a remote station to a master station. A synchronous data transmission system comprising the synchronous data transmitters 303 and 404 and their associated synchronous data receivers 304 and 403 interconnect the remote and master stations. The connecting transmission facility is preferably an audio bandwidth four-wire telephone transmission facility although it is to be understood that other narrow bandwidth transmission facilities may be substituted therefor without departing from the spirit and scope of the invention. A specific embodiment of a synchronous data transmission system suitable for use in the present invention is disclosed in the aforementioned P. A. Baker Patent 3,128,343, issued Apr. 7, 1964.

Upon the occurrence of a fault as indicated in FIG. 3 at location 305 of the transmission line 300, a fault surge is generated by the voltage collapse at the fault in the power transmission line producing a steep propagating wave front designated herein as a fault surge. The fault surges are propagated in both directions away from the fault location 305 respectively toward the remote and master station. These fault surges, as designated by the waveforms 202 and 203 in FIG. 2, are detected subsequently by the fault surge detector 306 at the remote station and the fault surge detector 406 at the master station, respectively. The fault surge detectors 306 and 406 may be directly connected to the power transmission line at the switch yards of their respective stations. The fault surge detectors 306 and 406 comprise coupling circuitry, connected to each line of the power transmission line, to limit the amplitude of the fault surge to some definite voltage without introducing delay variations in to the timing of its leading edge. The fault surge detectors 306 and 406 additionally include apparatus to derive a unidirectional fault surge signal of one polarity from the incident fault surge regardless of its original polarity. The amplitude limiting means may comprise voltage breakdown techniques or other signal limiting apparatus. The unidirectional fault surge signal may be derived by rectification techniques. A fault surge detector suitable for use in the present invention is disclosed in FIG. 6 and is described in detail hereinbelow. The variable time interval between the respective arrivals at the remote and master station of these oppositely directed fault surges 202 and 203, as illustrated in FIG. 2 is utilized to compute the location of the fault.

The fault surge detector 306 in response to the detected fault surge clips its amplitude, rectifies it to a preselected polarity and applies the resulting fault surge signal to the control gate 307. The control gate 307, in response thereto, is enabled to transmit the output of the clock pulse source 308 to the frequency divider 309 and in addition generates an output signal on lead 328, as discussed hereinbelow. The control gate 307 may comprise any signal transmission gate capable of transmitting a series of pulse signals at a high repetition rate without significant distortion. The clock pulse source 308 may comprise a crystal oscillator with frequency multiplying and pulse shaping circuits to generate a high precision fixed frequency series of pulse signals. In the illustrative embodiment, the pulse repetition rate of the clock pulse source 308 is set at 10 mHz., however, it is to be understood that the invention is not limited to any particular frequency.

The aforementioned series of clock pulse signals are applied to the frequency divider 309. The frequency divider 309 divides the repetition rate of the clock pulse signal series to a repetition rate equaling the basic timing pulse signal rate of the synchronous data transmitter 303, which in the illustrative embodiment is equal to 2 kHz. This 2 kHz. signal corresponds to the basic timing signal rate which is described in the aforementioned Baker patent and is designated SCT therein. This derived 2 kHz. timing signal, designated 206 in FIG. 2, is applied to a binary divider 311 which further divides it to produce the pulse series, designated 207 in FIG. 2, having a repetition rate of 1 kHz. This 1 kHz. signal corresponds to a 1 kHz. pulse signal derived internally in the synchronously data transmitter 303 and which is designated DCT in the aforementioned Baker patent. This derived 1 kHz. signal is compared in phase with the internally derived 1 kHz. signal of the synchronous data transmitter 303 shown in FIG. 2 as the pulse series 208 which designates the pulses controlling the timing of transmission slots. The phase comparison is utilized, as described below, to control the source of timing signals of the synchronous data transmitter 303 so that the timing signals are in an exact phase relation with the detected fault surge.

The aforementioned externally derived 1 kHz. signal is applied to the serially connected decade counters 312, 313, and 314. The respective signal outputs of the three decade counters 312, 313, and 314 are applied in parallel to a preset delay gate 317 which in response to a preselected signal output combination of the decade counters generates a pulse signal which is applied to the multivibrator circuit 318 to initiate the generation and transmission of a stop time measurement pulse as is described in detail hereinbelow.

The SCT timing pulse signals of the synchronous data transmitter 303, in the present embodiment of the invention, are normally supplied by recovering the SCR clock signals generated in the synchronous data receiver 304 from phase information transmitted to it from the synchronous data transmitter 404.

The synchronous data receiver 304 according to the present invention is arranged to apply these SCT timing pulse signals, via the lead 321 and the transmission gate 323, to the signal transmission circuitry of the synchronous data transmitter 303. The transmission gate 323 is controlled by signals applied to it, via lead 328, from the control gate 307. When the control gate 307 is activated by a fault surge signal, a signal is applied, via lead 328, to the transmission gate 323, which in response thereto, transmits the SCT' pulse signals which are derived from the clock pulse source 308 and applied to it by the transmission gate 325, to the signal transmission circuitry of the synchronous data transmitter 303. When the control gate 307 is not activated, the transmission gate 323 applies the SCT timing pulse signals, derived from the synchronous data receiver 304, to the synchronous data transmitter 303. Frequency division circuitry internal to the synchronous data transmitter 303, as described above, divides the 2 k Hz. SCT timing pulses into the 1 k Hz. DCT pulse signals. The timing pulse signals derived from the clock pulse source 308 shall be designated hereinbelow as SCT' and DCT' corresponding to the designations of the corresponding timing pulse signals generated internally in the synchronous data transmitter 303 and receiver 304.

The substitution of the SCT' timing pulse signals for the SCT timing pulse signals is controlled by the phase coincidence detector 320. The phase coincidence detector 320 generates an output signal when the two inputs applied to it, via leads 315 and 316 are out of phase or in the case of timing pulse signals when they are not of the same polarity. No output signal is generated when the two signals are in phase. The action of the phase coincidence detector 320 in substituting the SCT' timing pulse signals for the SCT timing pulse signals may be best explained with specific reference to what occurs when a fault surge is detected. Upon the detection of a fault surge, the control gate 307 applies a signal to the transmission gate 323 which causes it to disable the transmission of the SCT timing pulse signals and enable the transmission of the SCT' timing pulse signals applied to it by the transmission gate 325. If the DCT pulse signals and the DCT' pulse signals are not in phase, however, the phase coincidence detector 320 applies a signal, via lead 329, to the inhibit input of the transmission gate 325, which prevents it from applying the SCT' pulse signals derived from the frequency divider 309 to the transmission gate 323. Hence no timing signals are applied to the synchronous data transmitter 303 and no internally derived DCT pulse signals are generated. Hence the internal circuitry of the synchronous data transmitter 303 leaves the lead 315 at the polarity of the now discontinued DCT pulse signals at the time at which the application of the SCT pulse signals to the synchronous data transmitter 303 was discontinued.

The DCT' pulse signals derived from the binary divided SCT' timing pulse signals are applied to the phase coincidence detector 320. When the polarity of the signal level on lead 315 matches the polarity of the DCT' signal applied, via lead 316, to the phase coincidence detector 320, the output signal of the pulse coincidence detector 320 is discontinued and hence the inhibit input signal applied to the transmission gate 325 is removed. The enabled transmission gate 325 thus transmits the SCT' timing pulse signals, via the transmission gate 323, to the internal timing circuitry of the synchronous data transmitter 303. The DCT pulse signals derived from these SCT' pulse signals are in phase with the DCT' pulse signals and hence the transmission gate 325 remains enabled.

After the phase correction interval, the SCT' timing pulse signals are substituted for the SCT timing pulse signals as the timing source of the synchronous data transmitter 303. The DCT pulse signals in phase with the SCT' timing pulse signals are utilized to govern the timing of data acceptance for transmission purposes. These pulse signals are shown by waveform 209 and are in an exact phase relationship with the detected fault surge. The stop time measurement pulse, as described hereinbelow, is directly derived from the DCT' pulse signals and hence is likewise in an exact phase relation with both the timing of the data transmission slots of the synchronous data transmitter 303 and the detected fault surge.

The stop time measurement pulse, designated 210 in FIG. 2, is generated in response to a predetermined count output of the decade counters 312, 313, 314. The decade counters 312, 313, and 314 each apply their respective output signals to a preset delay gate 317. The preset delay gate 317 may comprise any logic gating circuitry in combination with a pulse signal source which in response to a preselected pattern of a plurality of signal inputs generates a pulse signal.

The output pulse signal of the preset delay gate 317 activates a bistable multivibrator 318. The activated bistable multivibrator 318 applies an output pulse, designated 215 in FIG. 2, to the stop pulse gate 319, via lead 315. The stop pulse gate 319 consequently is enabled to transmit the inverted frequency divided DCT' pulse signals applied thereto, via the inverter 333 and lead 331, to the data input lead SD of the synchronous data transmitter 303.

The first positive pulse output of the enabled signal transmission gate 319 is applied, via lead 336 and the adjustable delay 337, to the reset input of the bistable multivibrator 318. The delay is adjusted to limit transmission through the stop pulse gate 319 to one full cycle of the inverted DCT' pulse signals. Hence the adjusted delay period equals the duration of one positive pulse. Upon the resetting of the bistable multivibrator 318, the enabling signal applied to the stop pulse gate 319, via lead 315 is terminated and the stop pulse gate 319 is thereby disabled.

The particular order of the two binary bits comprising the stop time measurement pulse is determined by the particular one of the leads 331 or 332 to which the input lead of the gate 319 is connected. In the present embodiment, the input lead is attached to lead 331, which includes the inverter 333. This connection produces the 10 stop time measurement pulse, designated 210 in FIG. 2. Once the binary combination of a stop time measurement pulse is selected, it is retained because each particular combination has a unique transmission time through the synchronous data transmission system.

The aforementioned output pulse signal of the preset delay gate 317 is also transmitted, via a delay circuit 340, to a reset control 345. The delay imposed on this output pulse signal is sufficient to retard application of the pulse signal to the reset control 345 until the stop time measurement pulse has been completely transmitted. The reset control 345 in response to the delayed pulse signal applies recycling signals to the control gate 307, the frequency divider 309, the binary divider 311, and the decade counters 312, 313, and 314. The aforementioned components are hence reset in preparation to respond to the detection of subsequent fault surges.

The aforementioned oppositely directed fault surge, designated 203 in FIG. 2, is processed by the fault surge detector 406, in the same manner as described above with reference to the detector 306 and applied to the control gate 407. The control gate 407, in response thereto, enables the application of the pulse output of the clock pulse source 408 to the time interval measuring set 419 comprising the serially connected decade counters 411 to 417. The pulse output is utilized by the counters 411 to 417 to measure a time interval in terms of pulses counted. The clock pulse source 408 may be identical in design to the clock pulse source 308 in FIG. 3.

The outputs of the decade counters 411 to 415, representing the least significant digits of the total count of all the counters, are connected to the digital printing apparatus 421. The outputs of the decade counters 415 to 417, representing the most significant digits, are connected to a preset delay gate 423. The preset delay gate 423 in response to a particular output combination of the three decade counters 415 to 417 applies a signal, via lead 424, to the stop pulse gate 425. This signal enables the stop pulse gate 425 to transmit the stop time measurement pulse received, via the synchronous data receiver 403 and lead 426, to the control gate 407. The stop pulse gate 425 is enabled for transmission only during the time period of possible receipt of the stop time measurement pulse, as shown by the time interval 220 in FIG. 2. This specific time interval 220, during which the stop pulse gate 425 is enabled, is delayed to isolate the timing system and the associated digital printout system from a possible erroneous stop time measurement pulse caused by the transient signals immediately following the fault pulse and hence prevent the printout of a false time measurement.

The encoded stop time measurement pulse, designated 221 in FIG. 2, received by the synchronous data receiver 403 is applied, via the stop pulse gate 425, to the control gate 407 and causes it to inhibit the transmission of the pulse output of the clock pulse source 408 to the decade counters 411 to 417, thereby halting counting action therein. At the termination of the counting action, a time interval, shown as interval 225 in FIG. 2, is indicated by the total count. The variable time interval is determined by subtracting the fixed time intervals from the interval 225, as discussed with reference to FIG. 1.

The stop pulse gate 425 also transmits the stop time measurement pulse to a printer control circuit 427. The printer control circuit 427, in response thereto, applies a signal to the digital printer 421 which prints the count of the five least significant digits of the time interval measuring set 419 at which its decade counters 411 to 415 are halted.

The stop time measurement pulse is additionally applied, via a delay circuit 435 to a reset circuit 440. The delay circuit 435 delays the stop time measurement pulse sufficiently to allow completion of the count printout. The reset circuit 440 in response to the stop time measurement pulse applies a recycling signal to the decade counters 411 to 417 of the time interval measuring set 419 to reset them in preparation for the operation of the fault locating system in the location of a subsequent detected fault. A digital clock 460 appends the time of the measurement to the measured time interval.

Additional circuitry is also provided at both the master and remote stations to perform an automatic exercise test to periodically verify the proper operating condition of the fault locating system. The circuitry comprises two automatic exercise circuits 350 and 450, respectively located at the remote and master stations. The automatic exercise circuits 350 and 450 may comprise any circuitry capable of generating accurate timing pulse signals similar to a fault surge signal in response to a periodic time signal input. Hence in response to a periodic signal output of the digital clock 460, a timing pulse signal is applied simultaneously to the synchronous data transmitter 404 and the control gate 407. The control gate 407, in response thereto, transmits clock pulse signals to the time interval measuring set 419 thereby initiating a time interval measurement.

The timing pulse signal applied to the synchronous data transmission set 404 is encoded therein and transmitted thereby to the automaitc exerciser 350 of the receiver which, in response thereto, applies a timing pulse signal to the control gate 307. The control gate 307 enables the application of the pulse signals of the clock pulse source 308 to the frequency dividers and the subsequent decade counters 312 to 314 in the same manner as described above for the detected fault surge. At the expiration of the fixed time interval, a stop time measurement pulse is transmitted, via the synchronous data transmission system to the master station to halt the measured time interval of the time interval measurement set 419. The digital clock 460 is keyed to standard chronological time and at periodic intervals generates the aforementioned signal output. In this fashion the proper operation of the fault locating system is periodically automatically checked.

FIG. 6 shows a fault surge detector which may be used to couple fault surges detected on a three-phase transmission system to the timing equipment of the fault locating system at the master and remote stations. The fault surge detector has three identical separate phase sections each of which is individually connected, via a coupling capacitor 601, to a different phase line 600 of the three-phase transmission system. The capacitance magnitude of the coupling capacitor 601 is selected to present a high impedance to power signals at the low power frequency and a low impedance to the high frequency of a fault surge transient. Each of the coupling capacitors 601 of each phase section is connected to ground, via an inductor 602. The inductance of the inductor 602 is selected to present a low impedance to power signals at the low power frequency and a high impedance to the high frequency of a fault surge transient. Hence it is apparent to those skilled in the art that power line signals will be substantially isolated from the detector and fault surge transients will be readily admitted thereto.

A detected fault surge transient is transmitted from any one of the lines 600 by its respective coupling capacitor 601 and a connector 603 to a capacitive voltage divider comprising the capacitors 606, 607, and 608. The fault surge is reduced in magnitude by the capacitive voltage divider to limit its amplitude to a magnitude within the capability of the subsequent timing equipment to which it is applied. An additional amplitude protection device is included in the form of a spark gap 609. The spark gap 609 limits the maximum amplitude of the fault surge transient transmitted to the capacitive voltage divider by the occurrence of a controlled spark gap breakdown if the fault surge amplitude exceeds some predetermined threshold value.

The fault surge, as limited in amplitud by the capacitive divider and the spark gap, is transmitted by a pulse transformer 610 to a rectifier comprising the diodes 613 and 614 connected to the secondary coil of the transformer 610. The diodes 613 and 614 of the three rectifiers are also connected to a common output which in turn is connected to the primary of the single isolation transformer 616. The rectifier derives a steep wavefront fault surge signal of one polarity from the amplitude limited fault surge. This derived fault surge signal is applied by the isolation transformer 616 to a coaxial cable 618 which connects it to the input transformer of the control gate of the fault locator at that particular station locaion.

It will be apparent to those skilled in the art that the aforedescribed fault surge detector efficiently transforms the detected fault surge into a unidirectional steep wavefront fault surge signal suitable for accurately initiating activity in the timing circuitry of the fault locator without producing error causing delay variations. This effect is advantageously attained through the use of passive circuit elements without the need for active circuit elements.

While the above invention has been described with respect to one specific illustrative embodiment, many variations of the invention will suggest themselves to those skilled in the art without departing from the spirit and scope of the invention.

What is claimed is:

1. Apparatus to locate faults in a transmission facility interconnecting a near and a remote location comprising, a power transmission line interconnecting said near and said remote location, means at said near and said remote location to detect fault surge wavefronts propagating along said power transmission line, a synchronous data transmission system including an internal source of data transmission timing control signals interconnecting said near and said remote locations, means to measure a time interval, means at said near location to initiate the measurement of a time interval by said means to measure a time interval in response to a fault surge wavefront detected by said means to detect, means at said remote location to synchronize the timing of transmission of binary data in said synchronous data transmission system with the leading edge of the fault surge wavefront detected by said means to detect at said remote location, said means to synchronize including an external source of timing control signals, said external source generating timing signals in response to and in synchronism with a fault surge wavefront detected by said means to detect, means to compare the phase of the timing signals generated by said internal and said external source of timing control signals, means responsive to said means to compare to substitute timing signals generated by said external source in place of timing signals generated by said internal source to control data transmission timing in said synchronous data transmission system, means responsive to said means to synchronize to generate a stop time measurement pulse by gating a timing pulse generated by said external source of timing control signals at the termination of a fixed time interval following the detection of said fault surge wavefront by said means to detect at said remote location, and means to insert said stop time measurement pulse into said synchronous data transmission system to transmit it to said near location, and means at said near location to utilize the received stop time measurement pulse to halt said measurement of a time interval by said means to measure a time interval, whereby the time interval measured is used to determine the location of a fault causing the fault surge wavefront.

2. Apparatus to locate faults as defined in claim 1 wherein said external source of timing signals comprises a source of very high frequency pulse signals, frequency division means to reduce the frequency of said very high frequency pulse signals to pulse signals having a frequency suitable for the timing of said synchronous data transmission system, means responsive to a detected fault surge wavefront to apply said high frequency pulse signals to said frequency division means, said means to substitute including first pulse signal gating means responsive to said means responsive to a detected fault surge wavefront to inhibit the application of timing pulse signals generated by said internal source to said synchronous data transmission system and second pulse gating means responsive to said means to compare the phase to enable the application of said pulse signals reduced in frequency to said synchronous data transmission system to control timing therein.

3. Apparatus to locate faults as defined in claim 2 further including means at said near location to inhibit the reception of stop time measurement pulses until the expiration of some predetermined fixed delay period.

4. Apparatus to locate faults as defined in claim 3 wherein said means to detect fault surge wavefronts comprises means to block the transmission of low frequency power signals, means to limit the amplitude of detected fault surge wavefronts and means to control the polarity of said detected fault surge wavefront.

5. Apparatus to locate faults in a transmission facility having a near and a remote end comprising means to detect fault surge wavefronts coupled to the transmission facility at the near and remote end, respectively, said means to detect fault surge wavefronts generating a signal upon the arrival of a fault surge waterfront, time interval measuring means at the near end connected to and responsive to the signal output of the means to detect fault surge wavefronts at the near end, stop time measurement pulse generation means at the remote end coupled to the signal output of the means to detect fault surge wavefronts at the remote end, synchronous data tarnsmission means to couple said stop time measurement pulse generation means to said time interval measuring means, said synchronous data transmission means including a standard timing source, means to synchronize said synchronous data transmission means with the leading edge of the fault surge wavefront detected by the means to detect fault surge wavefronts at the remote end, said synchronizing means including timing signal generation means to generate a series of synchronization timing pulses in response to the signal output of the means to detect fault surge wavefronts at the remote end, means to compare the phase of the timing pulses generated by said standard timing source and said timing signal generation means, timing signal gating means responsive to said means to compare the phase to apply said synchronization timing pulses to said synchronous data transmission means for timing purposes, said stop time measurement pulse generation means counting in response to said timing signal generation means and generating a stop time measurement pulse at the expiration of a preselected count in synchronism with said synchronization timing pulses, means to apply said stop time measurement pulse to said synchronous data transmission means and means at the near end to utilize the stop time measurement pulse transmitted by said synchronous data transmission means to inhibit the timing action of said time interval measuring means.

6. Apparatus to locate faults as defined in claim 5 wherein said means to detect fault surge wavefronts comprises means to separate detected fault surge wavefronts from low frequency power signals means to limit the amplitude of said fault surge wavefront including means to clip the amplitude of said fault surge wavefront if it exceeds some threshold value and means to derive a pulse signal with a predetermined polarity from said amplitude limited fault surge wavefront.

7. Apparatus to locate faults as defined in claim 6 wherein said stop time measurement pulse generation means includes signal gating means to transmit the output of said timing signal generation means and means to inhibit said signal gating means at the expiration of one cycle of the output of said timing signal generation means.

References Cited

UNITED STATES PATENTS

| | | | |
|---|---|---|---|
| 2,717,992 | 9/1955 | Weintraub | 324—52 XR |
| 2,725,526 | 11/1955 | Stringfield et al. | 324—52 |
| 2,794,071 | 5/1957 | Hughes et al. | 179—175.3 XR |
| 3,128,343 | 4/1964 | Baker | 178—67 |

GERARD R. STRECKER, Primary Examiner

U.S. Cl. X.R.

178—67; 179—175.25